(12) United States Patent
Cook et al.

(10) Patent No.: US 10,715,244 B2
(45) Date of Patent: Jul. 14, 2020

(54) SIGNAL BOOSTER WITH BALANCED GAIN CONTROL

(71) Applicant: WILSON ELECTRONICS, LLC, St. George, UT (US)

(72) Inventors: Patrick Lee Cook, Cedar City, UT (US); Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 16/179,604

(22) Filed: Nov. 2, 2018

(65) Prior Publication Data

US 2019/0207669 A1 Jul. 4, 2019

Related U.S. Application Data

(60) Provisional application No. 62/612,136, filed on Dec. 29, 2017.

(51) Int. Cl.
*H04B 7/155* (2006.01)
*H04B 17/318* (2015.01)
(Continued)

(52) U.S. Cl.
CPC ..... *H04B 7/15535* (2013.01); *H04B 7/15542* (2013.01); *H04B 7/15578* (2013.01); *H04B 17/27* (2015.01); *H04B 17/318* (2015.01); *H04B 17/327* (2015.01); *H04B 17/382* (2015.01); *H04W 52/283* (2013.01); *H04W 88/04* (2013.01)

(58) Field of Classification Search
CPC ............ H04B 7/15535; H04B 7/15542; H04B 7/15578; H04B 17/327; H04B 17/382; H04W 88/04
See application file for complete search history.

(56) References Cited

U.S. PATENT DOCUMENTS

| 4,776,032 A | 10/1988 | Odate et al. |
| 5,303,395 A | 4/1994 | Dayani |

(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.
(Continued)

*Primary Examiner* — Dominic E Rego
(74) *Attorney, Agent, or Firm* — Thorpe North & Western

(57) ABSTRACT

Technology for a repeater is disclosed. The repeater can include a first-direction signal path, a second-direction signal path and a controller. The controller can set a first gain for the first-direction signal path based on a second-direction received signal level. The controller can set a second gain for the second-direction signal path based on the second-direction received signal level with a differential with respect to the first gain. The differential between the first gain and the second gain can be set for a first signal type. The controller can adjust the differential between the first gain and the second gain for a second signal type.

20 Claims, 8 Drawing Sheets

(51) Int. Cl.
*H04W 88/04* (2009.01)
*H04B 17/327* (2015.01)
*H04B 17/382* (2015.01)
*H04W 52/28* (2009.01)
*H04B 17/27* (2015.01)

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2* | 5/2005 | Bongfeldt | H04B 7/15535 455/11.1 |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,911,985 B2* | 3/2011 | Proctor, Jr. | H04B 7/15542 370/279 |
| 7,974,573 B2 | 7/2011 | Dean | |
| 9,054,664 B1* | 6/2015 | Ashworth | H03G 3/3042 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0063485 A1* | 3/2006 | Gainey | H04B 7/15542 455/15 |
| 2006/0084379 A1 | 4/2006 | O'Neill | |
| 2006/0205342 A1* | 9/2006 | McKay, Sr. | H04B 3/36 455/11.1 |
| 2007/0071128 A1 | 3/2007 | Meir et al. | |
| 2007/0188235 A1 | 8/2007 | Dean | |
| 2007/0268846 A1* | 11/2007 | Proctor, Jr. | H04B 7/15535 370/279 |
| 2008/0081555 A1 | 4/2008 | Kong et al. | |
| 2008/0096483 A1 | 4/2008 | Van Buren et al. | |
| 2008/0137561 A1* | 6/2008 | Kim | H04B 7/15535 370/279 |
| 2008/0278237 A1 | 11/2008 | Blin | |
| 2008/0293360 A1* | 11/2008 | Maslennikov | H04B 7/15578 455/24 |
| 2010/0177668 A1* | 7/2010 | Ahn | H04B 1/54 370/279 |
| 2011/0002368 A1* | 1/2011 | Yang | H04L 25/0272 375/214 |
| 2011/0151775 A1 | 6/2011 | Kang et al. | |
| 2017/0181103 A1* | 6/2017 | Deng | H04W 52/18 |

OTHER PUBLICATIONS

ADL5513; "1 MHz to 4 GHz, 80 dB Logarithmic Detector / Controller"; Data Sheet; (2008); 25 pages.
HMC713LP3E; "54 dB, Logarithmic Detector / Controller, 50-8000 MHz"; Data Sheet; (2010); 12 pages.
HMC909LP4E; "RMS Power Detector Single-Ended, DC-5.8 GHz"; Data Sheet; (2010); 21 pages.
PIC16F873; "28/40-Pin 8-Bit CMOS FLASH Microcontrollers"; Data Sheet; (2001); 2018 pages.

* cited by examiner

SIGNAL BOOSTER WITH BALANCED GAIN CONTROL

RELATED APPLICATIONS

The present application claims the benefit of U.S. Provisional Patent Application No. 62/612,136, filed Dec. 29, 2017, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
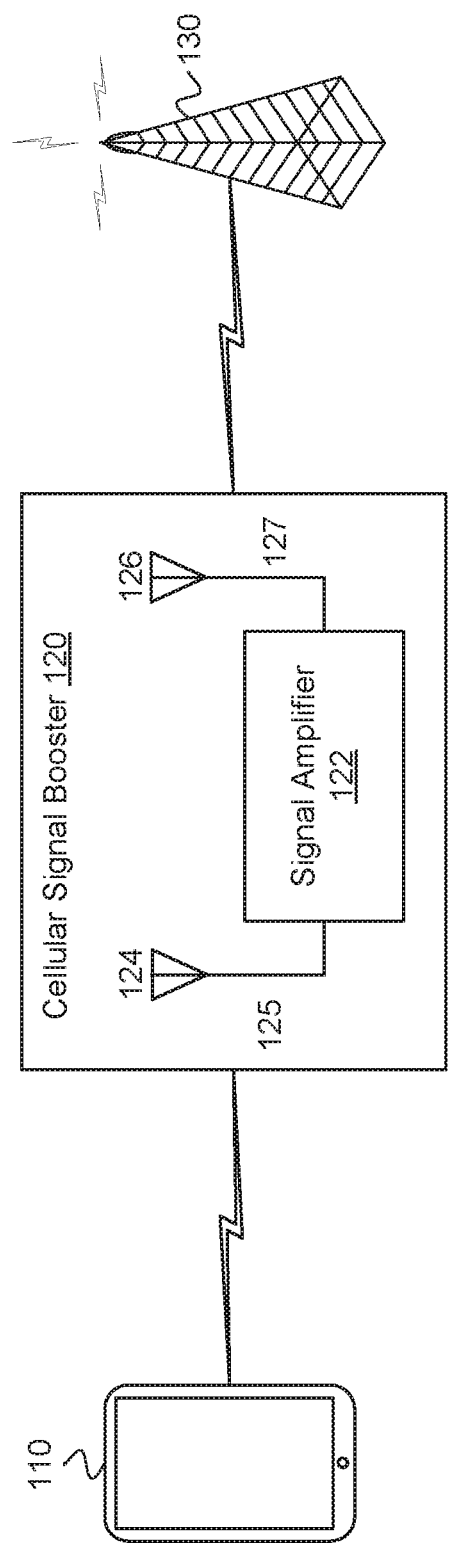
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
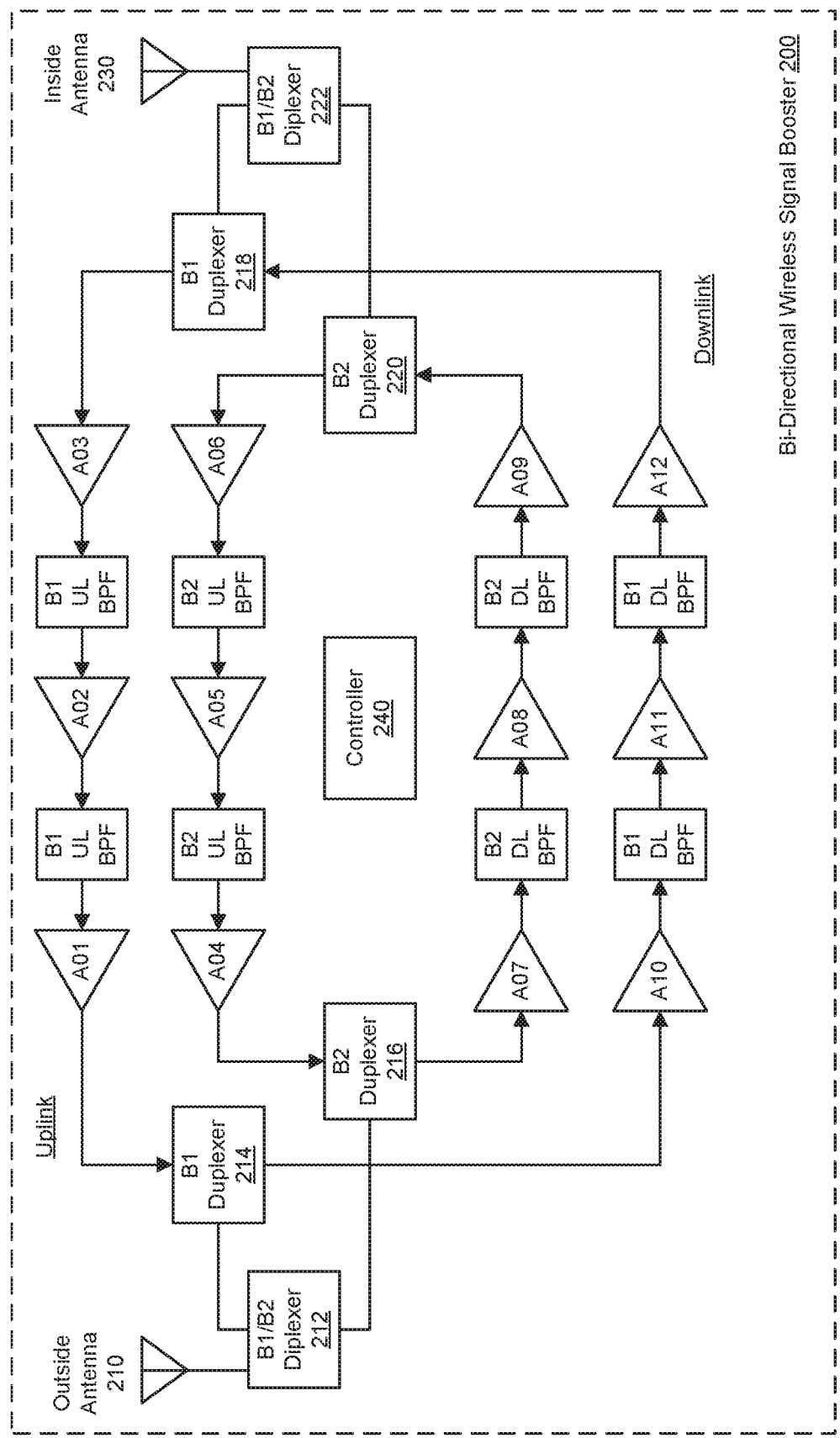
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

In one configuration, a signal booster (or repeater) can apply a certain level of gain to uplink and downlink signal paths, respectively. For example, the signal booster can apply a first amount of gain to an uplink signal path and a second amount of gain to a downlink signal path. In one example, the signal booster can select the first amount of gain and the second amount of gain accordingly depending on whether the signals being processed at the signal booster are Third Generation Partnership Project (3GPP) Long Term Evolution (LTE) signals, Code-Division Multiple Access (CDMA) signals, Voice over LTE (VoLTE) signals, etc. In addition, the signal booster can apply a certain level of balance between uplink and downlink gain depending on whether the processed signals are LTE signals, CDMA signals, VoLTE signals, etc. In other words, the signal booster can apply the first amount of gain to the uplink signal path, and the first amount of gain can be relatively similar to the second amount of gain that is applied to the downlink signal path, thereby resulting in a relatively balanced uplink and downlink gain in the signal booster.

In one example, a mobile device can receive a downlink signal from a base station via a signal booster, and based on a power level of the received downlink signal, the mobile device can transmit uplink signals to the base station at an appropriate power level via the signal booster. Based on the power level of the received downlink signal, the mobile device can expect to be a certain distance away from the base station. When the mobile device receives a strong downlink signal (e.g., a downlink signal with a power level that is above a defined threshold), the mobile device can infer that the base station is proximately located to the mobile device. As a result, the mobile device can transmit uplink signals at a weaker power level. In this case, the downlink signals can be associated with an increased power level, while the uplink signals can be associated with a reduced power level. However, in some situations, it can be advantageous to balance the gain between the uplink signals and the downlink signals at the signal booster, such that both the uplink signals and the downlink signals are associated with a similar amount of gain.

In previous solutions, signal boosters would unbalance uplink and downlink gains. In other words, in previous solutions, signal boosters would apply different amounts of gain to the uplink and downlink signal paths, respectively. For example, in previous solutions, a strong uplink signal would result in gain control of the uplink signal path (e.g., reducing an amount of gain for the uplink signal path) to maintain linearity for the uplink signal path, but the signal booster would not apply gain control to the downlink signal path. As a result, in previous solutions, the uplink signal path and the downlink signal path would be unbalanced (e.g., the signal booster would apply 40 decibels (dB) of gain to the uplink signal path, while applying 70 dB of gain to the downlink signal path). In other words, in previous solutions, uplink automatic gain control (AGC) at the signal booster would not result in downlink AGC at the signal booster, thereby resulting in the unbalanced gain between the uplink and downlink signal paths. In previous solutions, the downlink signal would not be adjusted to maximize a downlink output power under the FCC Consumer Booster Rules. In other words, in previous solutions, reducing the uplink gain would not result in a reduction of the downlink gain, despite the imbalance between the uplink and downlink gains, to ensure that other customers in a building would obtain a strong downlink signal.

Furthermore, in previous solutions, a strong downlink signal would result in gain control of the uplink signal path (e.g., reducing an amount of gain for the uplink signal path) for network protection. The strong downlink signal would be determined based on a received signal strength indicator (RSSI). In addition, the strong downlink would result in gain control of the downlink signal path (e.g., reducing an amount of gain for the downlink signal path) to maintain linearity for the downlink signal path. In other words, in previous solutions, for strong downlink signals, the signal booster would perform both downlink AGC and uplink AGC. However, in previous solutions, for strong downlink signals, the signal booster would reduce the gain of the uplink signal path by several dB before reducing the downlink gain, and this uplink-downlink gain differential would achieve a maximized downlink output power for FCC certification. In other words, in previous solutions, the uplink gain would be attenuated sooner than the downlink gain for a strong downlink signal, resulting in increased downlink output power. As a result, in previous solutions, there would be unbalanced gain between the uplink and downlink signal paths in the signal booster.

In previous examples, in-building signal boosters would employ a fixed gain differential between the uplink signal path and the downlink signal path. For example, in previous examples, signal boosters would employ a fixed 9 dB gain differential between the uplink signal path and the downlink signal path. In other words, in the past, the signal booster would use firmware to adjust the gain differently for the uplink and downlink signal paths. In this example, the downlink signal path would apply 9 dB more gain as compared to the uplink signal path. In the past, the fixed 9 dB gain differential for signal boosters would be advantageous because mobile devices that used the signal booster would experience an increase in downlink output power.

However, in some cases, it can be advantageous to have a relative balance between the uplink and downlink gain in the uplink and downlink signal paths, respectively, in the signal booster. For example, it can be advantageous to have a more balanced booster gain when the signal booster is processing VoLTE signals. For example, a mobile device that is connected to the signal booster can be engaged in a VoLTE call, and the signal booster can be processing the VoLTE signals for the mobile device. In this case, the previous solution of employing a fixed gain differential of 9 dB in the signal booster would result in a reduced VoLTE call quality for the mobile device.

In the present technology, a signal booster can employ a balanced uplink-downlink gain control. For example, the signal booster can employ an adjustable uplink-downlink gain differential. The adjustable uplink-downlink gain differential can enable a gain differential to be adaptively set for the uplink signal path and the downlink signal path. For example, the adjustable uplink-downlink gain differential can enable the gain differential between the uplink and downlink signal paths to range from 0 dB to 9 dB. Here, a 9 dB uplink-downlink gain differential can result in a difference of 9 dB in gain between the uplink and the downlink signal paths, a 5 dB uplink-downlink gain differential can result in a difference of 5 dB in gain between the uplink and the downlink signal paths, and so on. A 0 dB uplink-downlink gain differential can indicate that the uplink and downlink gains for the uplink and downlink signal paths are the same (i.e., the difference is 0 dB in gain between the uplink and the downlink signal paths). The ability to adjust the uplink-downlink gain differential to balance the uplink and downlink gains can be advantageous when the signal booster is processing certain types of signals, such as VoLTE signals.

In one example, the signal booster can use firmware to adjust the uplink-downlink gain differential based on a setting received from a user of the signal booster. In other words, the signal booster can employ a user-adjustable uplink-downlink gain differential. For example, the user can set the uplink-downlink gain differential to a value that is within a range of permitted uplink-downlink gain differentials for the signal booster. For example, if the signal booster permits an adjustable uplink-downlink gain differential between 0 dB and 9 dB, the user can leave the uplink-downlink gain differential at 9 dB (e.g., a factory setting), or the user can manually adjust the uplink-downlink gain differential to be 7 dB, 5 dB, etc.

In one example, the gain differential between the uplink signal path and the downlink signal path can be an allowed gain differential. For example, a user selecting a 10 dB gain differential does not mean that the gain differential is always 10 dB. Rather, the 10 dB gain differential is only enforced when the AGCs are exercised due to a power level of one of an uplink signal or a downlink signal exceeding a defined threshold.

As a result, the gain for the uplink and downlink signal paths can be relatively balanced, which can be advantageous when the user is utilizing the signal booster to boost a VoLTE call. For example, if the user is experiencing a relatively high number of dropped VoLTE calls at the mobile device, the user can manually adjust the uplink-downlink gain differential to be 0 dB, which can improve the signal booster's ability to effectively boost VoLTE calls for the mobile device.

In one example, the user-adjustable uplink-downlink gain differential can permit the user to set a negative uplink-downlink gain differential. For example, the signal booster can permit the adjustable uplink-downlink gain differential to be between 0 dB and −9 dB. The negative uplink-downlink gain differential can be employed to address booster amplitude ripple, which can already cause some gain imbalance in the signal booster. For example, during production, a peak gain in uplink and downlink can be set to a same level, but due to the amplitude ripple in the signal booster, the peak gains can be different for the uplink and downlink signal paths. Therefore, the negative uplink-downlink gain differential can sometimes be beneficial to balance gains at a certain frequency or for a specific channel.

In one example, during production, the signal booster can be set to employ a zero uplink-downlink gain differential between the uplink and downlink signal paths. In other words, during production, the signal booster can be configured via firmware to apply a same amount of gain to both the uplink and downlink signal paths as a default setting, thereby balancing the gain that is applied in the uplink and downlink signal paths. In addition, the signal booster can be configured via firmware to employ the user-adjustable uplink-downlink gain differential. Therefore, after the signal booster is installed in a building, a user of the signal booster can manually adjust the uplink-downlink gain differential depending on user criteria. For example, if the user is experiencing a relatively few number of dropped VoLTE calls, the user can adjust the uplink-downlink gain differential such that the downlink signal path applies more gain as compared to the uplink signal path. On the other hand, if the user is experiencing a relatively high number of dropped VoLTE calls, the user can maintain the factory setting of the zero uplink-downlink gain differential, which can result in improved performance for VoLTE calls.

In one configuration, the signal booster can employ an automatic adjustable uplink-downlink gain differential. In this configuration, the signal booster can have an ability to dynamically set the uplink-downlink gain differential. In one example, the signal booster can dynamically set the uplink-downlink gain differential depending on a type of signal being processed at the signal booster. For example, the signal booster can determine to automatically adjust the uplink-downlink gain differential to a certain value (e.g., 0 dB) when the signal booster is processing VoLTE calls. In other words, the signal booster can detect when a VoLTE call is occurring, and then set the uplink-downlink gain differential accordingly based on the detection of the VoLTE call. On the other hand, when the signal booster is not processing VoLTE calls (i.e., the signal booster is processing other data), the signal booster can set the uplink-downlink gain differential to another value (e.g., 5 dB), which can serve to maximize a downlink output power for the signal booster.

In one example, the signal booster can detect the presence of the VoLTE call (i.e., that the signal booster is processing VoLTE signals) based on information received from the mobile device that is engaged in the VoLTE call. For example, the signal booster can establish a connection with the mobile device, for example, a Bluetooth connection. When the mobile device is engaged in the VoLTE call, the mobile device can send an indication of the VoLTE call to the signal booster via the Bluetooth connection. As a result, the signal booster can determine that VoLTE signals are currently being processed by the signal booster, and the signal booster can automatically adjust the uplink-downlink gain differential to an optimal value due to the VoLTE call. For example, in response to receiving the indication of the VoLTE call from the mobile device via the Bluetooth connection, the signal booster can automatically adjust the uplink-downlink gain differential to be 0 dB, thereby causing an improved VoLTE call quality for the mobile device. In other words, a relative balance between the amounts of gain applied to the uplink and downlink signal paths in the signal booster can result in improved cellular call quality and data rates, especially for Voice over LTE (VoLTE) phone calls. In this example, the mobile device and the signal booster can be paired, such that the indication can be transmitted from the mobile device to the signal booster. In some cases, the mobile device can run an application that enables the mobile device to send the indication to the signal booster.

In addition, after the VoLTE call is finished, the mobile device can send a second indication to the signal booster via the Bluetooth connection, and the indication can indicate that the mobile device is no longer engaged in the VoLTE call. In response to receiving the second indication, the signal booster can automatically adjust the uplink-downlink gain differential to a previous value (e.g., 9 dB), which can maximize downlink output power when boosting non-VoLTE signals for the mobile device. In other words, a larger imbalance between the uplink and downlink gain can be advantageous when the signal booster is not processing VoLTE signals.

In one configuration, in the present technology, the signal booster (or a controller in the signal booster) can apply AGC (or gain control) to both the uplink signal path and the downlink signal path in the signal booster when receiving a strong downlink signal from a base station, which can result in a relative balance in gain between the uplink and downlink signal paths in the signal booster. For example, when the signal booster receives the strong downlink signal (e.g., a RSSI of the downlink signal is above a defined threshold) from the base station, the signal booster can adjust a gain of both the uplink signal path and the downlink signal path. When receiving the strong downlink signal, the signal booster can apply a relatively balanced gain to the uplink and downlink signal paths, such that the gain applied to the uplink signal path is approximately the same as the gain applied to the downlink signal path. When receiving the strong downlink signal, the signal booster can reduce the gain in the uplink signal path for network protection, and the signal booster can correspondingly reduce the gain in the downlink signal path to maintain linearity for the downlink signal path, thereby achieving relative gain balance between the uplink and downlink signal paths in the signal booster.

Furthermore, in the present technology, the signal booster (or a controller in the signal booster) can apply AGC (or gain control) to both the uplink signal path and the downlink signal path in the signal booster when detecting a strong uplink signal being transmitted to the base station, which can result in a relative balance in gain between the uplink and downlink signal paths in the signal booster. For example, when the signal booster receives a strong uplink signal (e.g., a RSSI of the uplink signal is above a defined threshold) from the mobile device, the signal booster can adjust a gain of both the uplink signal path and the downlink signal path. When receiving the strong uplink signal, the signal booster can apply a relatively balanced gain to the uplink and downlink signal paths, such that the gain applied to the uplink signal path is approximately the same as the gain applied to the downlink signal path. When receiving the strong uplink signal, the signal booster can reduce the gain in the uplink signal path to maintain linearity for the uplink signal path, and the signal booster can correspondingly reduce the gain in the downlink signal, thereby achieving relative gain balance between the uplink and downlink signal paths in the signal booster.

In one example, the signal booster can apply both uplink AGC and downlink AGC regardless of whether the signal booster detects the strong downlink signal or the strong uplink signal. In addition, the signal booster can apply both uplink AGC and downlink AGC with a fixed gain differential or an adjustable gain differential, which can result in the signal booster maintaining a relatively balanced gain between the uplink and downlink signal paths. Therefore, when the uplink AGC and the downlink AGC are applied, there can be an uplink-downlink gain differential that is applied for the uplink and downlink signal paths. As previously described, the uplink-downlink gain differential can be user adjustable (e.g., range from −17 dB to +17 dB) or automatically applied depending on whether the signal booster is processing VoLTE signals for the mobile device.

As a non-limiting example, the signal booster can apply 30 dB of gain to the downlink signal path and 30 dB of gain to the uplink signal path. The signal booster can employ an adjustable uplink-downlink gain differential that is currently set to 0 dB (i.e., the gains between the uplink and downlink signal paths should be balanced). In one scenario, after receiving a strong downlink signal, the signal booster can decrease the gain applied to the uplink signal path by 5 dB and decrease the gain applied to the downlink signal path by 5 dB. As a result, the signal booster can comply with the 0 dB uplink-downlink gain differential setting. In another scenario, after detecting a strong uplink signal, the signal booster can decrease the gain applied to the uplink signal path by 10 dB and decrease the gain applied to the downlink signal path by 10 dB. As a result, the signal booster can comply with the 0 dB uplink-downlink gain differential setting.

In another non-limiting example, the signal booster can apply 50 dB of gain to the downlink signal path and 45 dB of gain to the uplink signal path. The signal booster can employ an adjustable uplink-downlink gain differential that is currently set to 5 dB. When receiving either a strong downlink signal or a strong uplink signal, the signal booster can decrease the gain applied to each of the uplink and downlink signal paths by 12 dB, thereby maintaining the 5 dB uplink-downlink gain differential setting.

Figure 3:
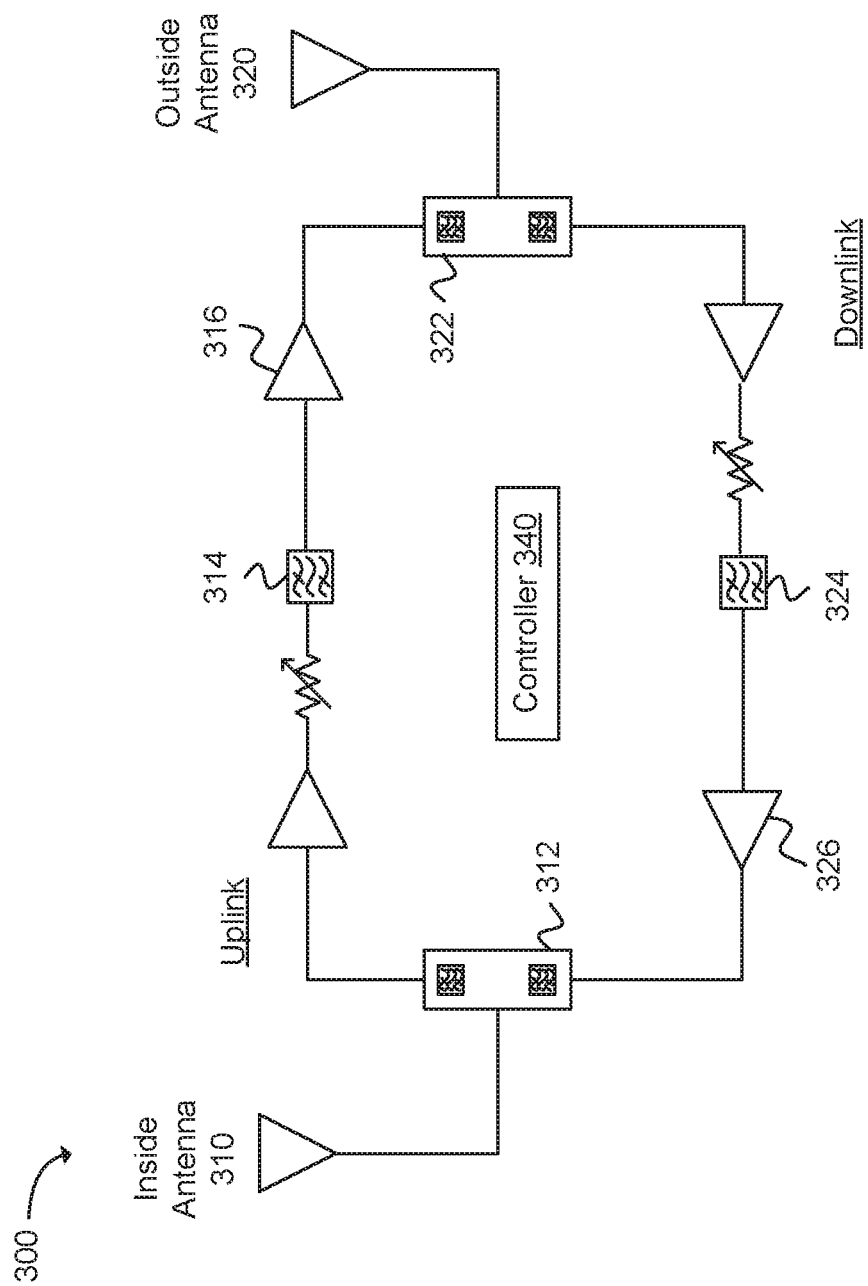
FIG. 3 illustrates a signal booster with balanced gain control in accordance with an example.

FIG. 3 illustrates an exemplary signal booster 300 (or repeater). The signal booster 300 can include an inside antenna 310 and a first duplexer 312 communicatively coupled to the inside antenna 310. The signal booster 300 can include an outside antenna 320 and a second duplexer 322 communicatively coupled to the outside antenna 320. The signal booster 300 can include an uplink signal path and a downlink signal path. The uplink signal path and the downlink signal path can be communicatively coupled between the first duplexer 312 and the second duplexer 322. In this example, the first duplexer 312 and the second duplexer 322 can be dual-input single-output (DISO) analog bandpass filters.

In one example, the uplink signal path and the downlink signal path can each include one or more amplifiers (e.g., low noise amplifiers (LNAs), power amplifiers (PAs)) and one or more bandpass filters. For example, the uplink signal path can include a bandpass filter 314 and a PA 316, and the downlink signal path can include a bandpass filter 324 and a PA 326. In this example, the bandpass filters can be single-input single-output (SISO) analog bandpass filters.

In one example, the uplink signal path and the downlink signal path can each include a variable attenuator. The variable attenuator can increase or decrease an amount of attenuation for a specific band in the uplink signal path or the downlink signal path, respectively. The variable attenuator can be increased in order to decrease a gain for a given band in a respective signal path, or the variable attenuator can be decreased in order to increase a gain for a given band in a respective signal path.

In one example, the outside antenna 320 in the signal booster 300 can receive a downlink signal from a base station (not shown). The downlink signal can be passed from the outside antenna 320 to the second duplexer 322. The second duplexer 322 can direct the downlink signal to the downlink signal path. The downlink signal can be amplified and filtered using one or more amplifiers and one or more filters, respectively, on the downlink signal path. The downlink signal (which has been amplified and filtered) can be directed to the first duplexer 312, and then to the inside antenna 310 in the signal booster 300. The inside antenna 310 can transmit the downlink signal to a mobile device (not shown).

In another example, the inside antenna 310 can receive an uplink signal from the mobile device. The uplink signal can be passed from the inside antenna 310 to the first duplexer 312. The first duplexer 312 can direct the uplink signal to the uplink signal path. The uplink signal can be amplified and filtered using one or more amplifiers and one or more filters, respectively, on the uplink signal path. The uplink signal (which has been amplified and filtered) can be directed to the second duplexer 322, and then to the outside antenna 320 in the signal booster 300. The outside antenna 320 can transmit the uplink signal to the base station.

In one configuration, the signal booster 300 can include a controller 340. The controller 340 can include a microcontroller or a discrete electrical circuit. The controller 340 can be configured to perform uplink AGC for the uplink signal path and downlink AGC for the downlink signal path. The controller 340 can perform uplink AGC for network protection and/or maintaining linearity of the uplink signal path, and the controller 340 can perform downlink AGC to maintain linearity of the downlink signal path.

In one configuration, the controller 340 can apply an adjustable uplink-downlink gain differential to the uplink and downlink signal paths in the signal booster 300. The adjustable uplink-downlink gain differential can enable a gain differential to be adaptively set for the uplink signal path and the downlink signal path. For example, the adjustable uplink-downlink gain differential can enable the gain differential between the uplink and downlink signal paths to range from 0 dB to 9 dB. The controller 340 can apply the adjustable uplink-downlink gain differential based on a user defined setting, or alternatively, the controller 340 can automatically apply the adjustable uplink-downlink gain differential upon detecting that a specific type of signal (e.g., VoLTE signals) is currently being processed by the signal booster 300.

In one example, the controller 340 can receive a strong downlink signal from the base station, and in response, the controller 340 can adjust a gain of both the uplink signal path and the downlink signal path (i.e., the controller 340 can perform both uplink AGC and downlink AGC). When receiving the strong downlink signal, the controller 340 can apply a relatively balanced gain to the uplink and downlink signal paths, such that the gain applied to the uplink signal path is approximately the same as the gain applied to the downlink signal path. In another example, the controller 340 can receive a strong uplink signal from the mobile device, and in response, the controller 340 can adjust a gain of both the uplink signal path and the downlink signal path (i.e., the controller 340 can perform both uplink AGC and downlink AGC). When receiving the strong uplink signal, the controller 340 can apply a relatively balanced gain to the uplink and downlink signal paths, such that the gain applied to the uplink signal path is approximately the same as the gain applied to the downlink signal path.

In one configuration, the controller 340 can apply both uplink AGC and downlink AGC regardless of whether the controller 340 detects a strong downlink signal or a strong uplink signal. In addition, the controller 340 can apply both uplink AGC and downlink AGC with a fixed gain differential or an adjustable gain differential, which can result in the signal booster 300 maintaining a relatively balanced gain between the uplink and downlink signal paths. Therefore, when the uplink AGC and the downlink AGC are applied by the controller 340, there can be an uplink-downlink gain differential that is applied for the uplink and downlink signal paths. As previously described, the uplink-downlink gain differential can be user adjustable (e.g., range from 0 dB to 9 dB) or automatically applied depending on whether the signal booster 300 is processing VoLTE signals for the mobile device.

In one configuration, the controller 340 can set a first AGC level for the uplink signal path based on a downlink received signal level (e.g., based on an RSSI of a received downlink signal). The controller 340 can set a second AGC level for the downlink signal path based on the downlink received signal level, where the second AGC level can have a differential with respect to the first AGC level. For example, the differential between the first AGC level and the second AGC level can range from −17 dB to +17 dB. The controller 340 can identify a signal type for communication on one of the downlink signal path or the uplink signal path, and the controller 340 can adjust the differential between the first AGC level and second AGC level based on the identified signal type. In one example, the controller 340 can adjust the differential by reducing the differential between the first AGC level and the second AGC level when the identified signal type is a first signal type, where the first signal type is a Voice over Long Term Evolution (VoLTE) signal type. In another example, the controller 340 can adjust the differential by increasing the differential between the first AGC level and the second AGC level when the identified signal type is a second signal type, where the second signal type is a non-VoLTE signal type. In yet another example, the controller 340 can identify the signal type based on an indicator received at the signal booster 300 from a mobile device, where the indicator can be received at the signal booster 300 from the mobile device over one of: a Bluetooth connection, a WiFi connection or a cellular connection between the signal booster 300 and the mobile device.

In one configuration, the controller 340 can set a first gain for the uplink signal path based on a downlink received signal level (e.g., based on an RSSI of a received downlink signal). The controller 340 can set a second gain for the downlink signal path based on the downlink received signal, where the differential between the first gain and the second gain can be set for a first signal type. For example, the differential between the first gain and the second gain can range from −17 dB to +17 dB. The controller 340 can adjust the differential between the first gain and the second gain for a second signal type. In one example, the first signal type can be a VoLTE signal type and the second signal type can be a non-VoLTE signal type. In another example, the differential between the first gain and the second gain can be a negative gain differential value to mitigate amplitude ripple on a defined channel of the signal booster 300. In yet another example, the controller 340 can receive from a mobile device (e.g., via a Bluetooth connection) an indication that the mobile device is performing a VoLTE call, and in response, the controller 340 can adjust the differential between the first gain and the second gain.

Figure 4:
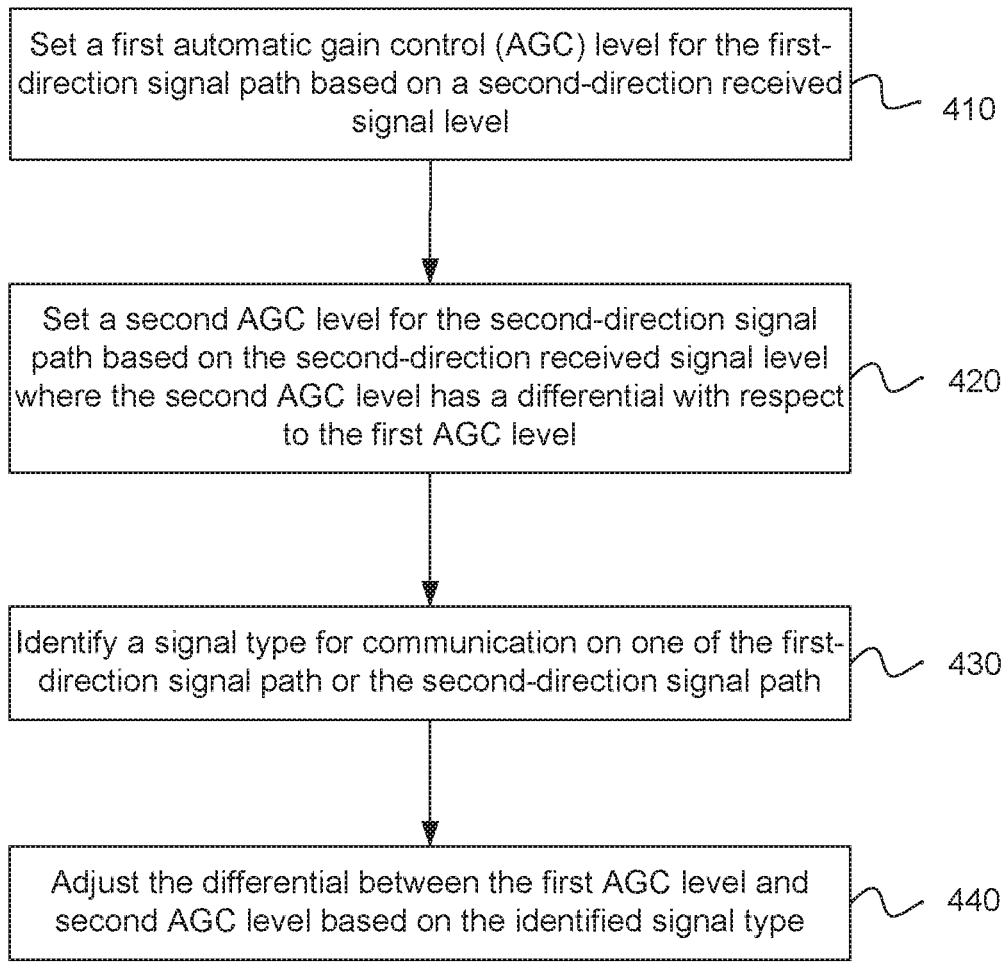
FIG. 4 depicts functionality of a repeater in accordance with an example.

FIG. 4 illustrates functionality of a repeater. The repeater can comprise a first-direction signal path, a second-direction signal path, and a controller. The controller can be operable to set a first automatic gain control (AGC) level for the first-direction signal path based on a second-direction received signal level, as in block 410. The controller can be operable to set a second AGC level for the second-direction signal path based on the second-direction received signal level where the second AGC level has a differential with respect to the first AGC level, as in block 420. The controller can be operable to identify a signal type for communication on one of the first-direction signal path or the second-direction signal path, as in block 430. The controller can be operable to adjust the differential between the first AGC level and second AGC level based on the identified signal type, as in block 440.

Figure 5:
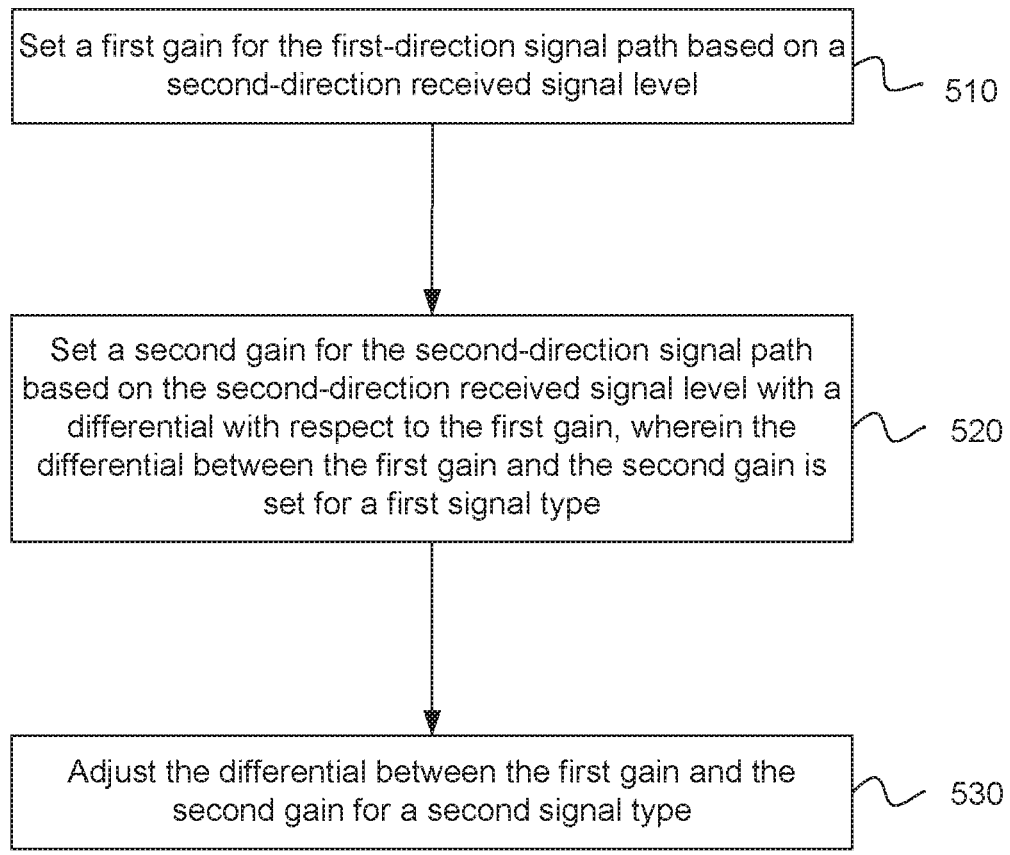
FIG. 5 depicts functionality of a repeater in accordance with an example.

FIG. 5 illustrates functionality of a repeater. The repeater can comprise a first-direction signal path, a second-direction signal path, and a controller. The controller can be operable to set a first gain for the first-direction signal path based on a second-direction received signal level, as in block 510. The controller can be operable to set a second gain for the second-direction signal path based on the second-direction received signal level with a differential with respect to the first gain, wherein the differential between the first gain and the second gain is set for a first signal type, as in block 520. The controller can be operable to adjust the differential between the first gain and the second gain for a second signal type, as in block 530.

Figure 6:
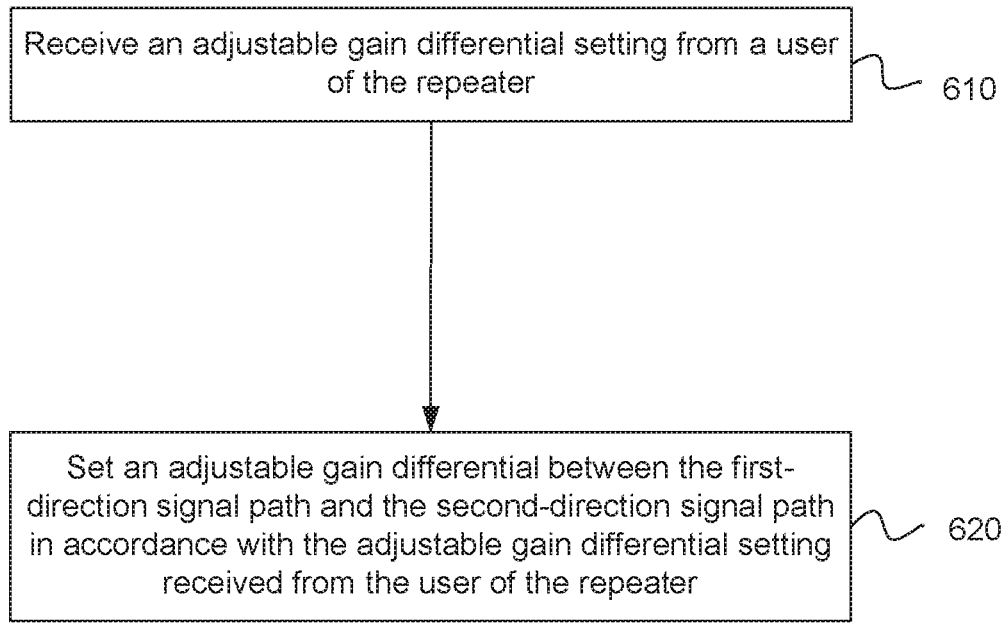
FIG. 6 depicts functionality of a repeater in accordance with an example.

FIG. 6 illustrates functionality of a repeater. The repeater can comprise a first-direction signal path, a second-direction signal path, and a controller. The controller can be operable to receive an adjustable gain differential setting from a user of the repeater, as in block 610. The controller can be operable to set an adjustable gain differential between the first-direction signal path and the second-direction signal path in accordance with the adjustable gain differential setting received from the user of the repeater, as in block 620.

Figure 7:
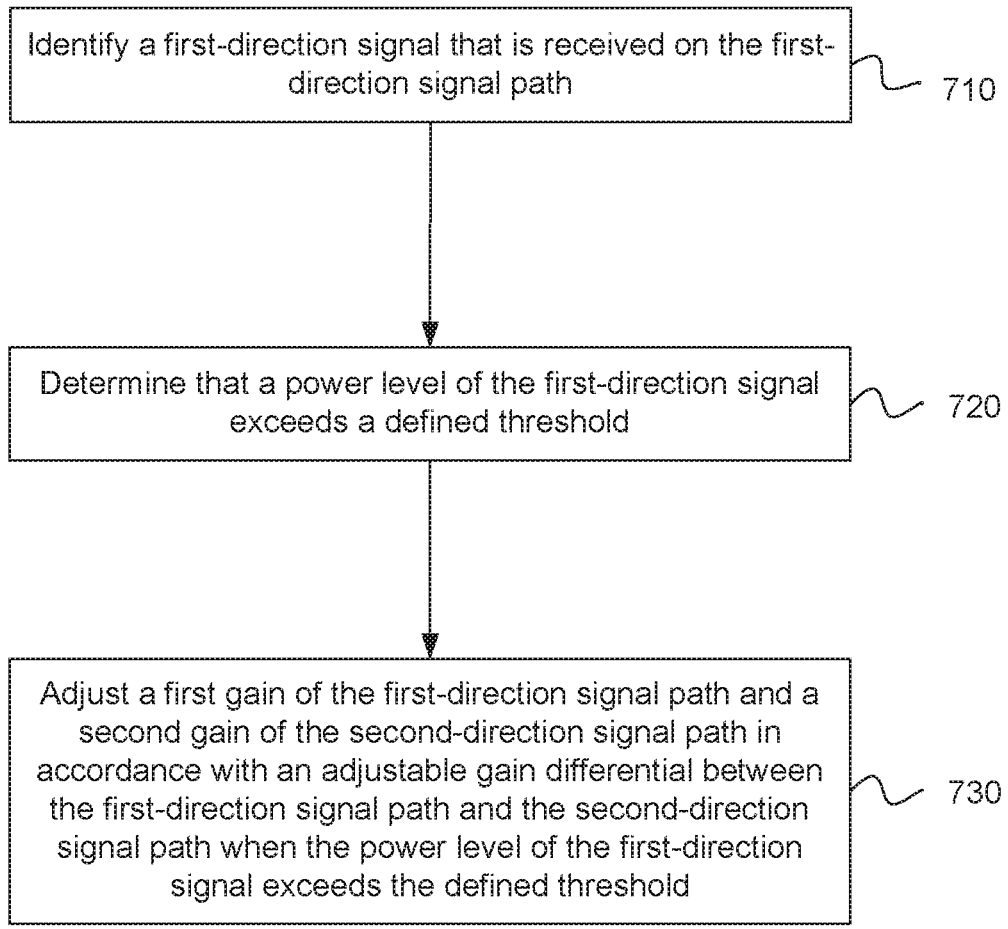
FIG. 7 depicts functionality of a repeater in accordance with an example.

FIG. 7 illustrates functionality of a repeater. The repeater can comprise a first-direction signal path, a second-direction signal path, and a controller. The controller can be operable to identify a first-direction signal that is received on the first-direction signal path, as in block 710. The controller can be operable to determine that a power level of the first-direction signal exceeds a defined threshold, as in block 720. The controller can be operable to adjust a first gain of the first-direction signal path and a second gain of the second-direction signal path in accordance with an adjustable gain differential between the first-direction signal path and the second-direction signal path when the power level of the first-direction signal exceeds the defined threshold, as in block 730.

Figure 8:
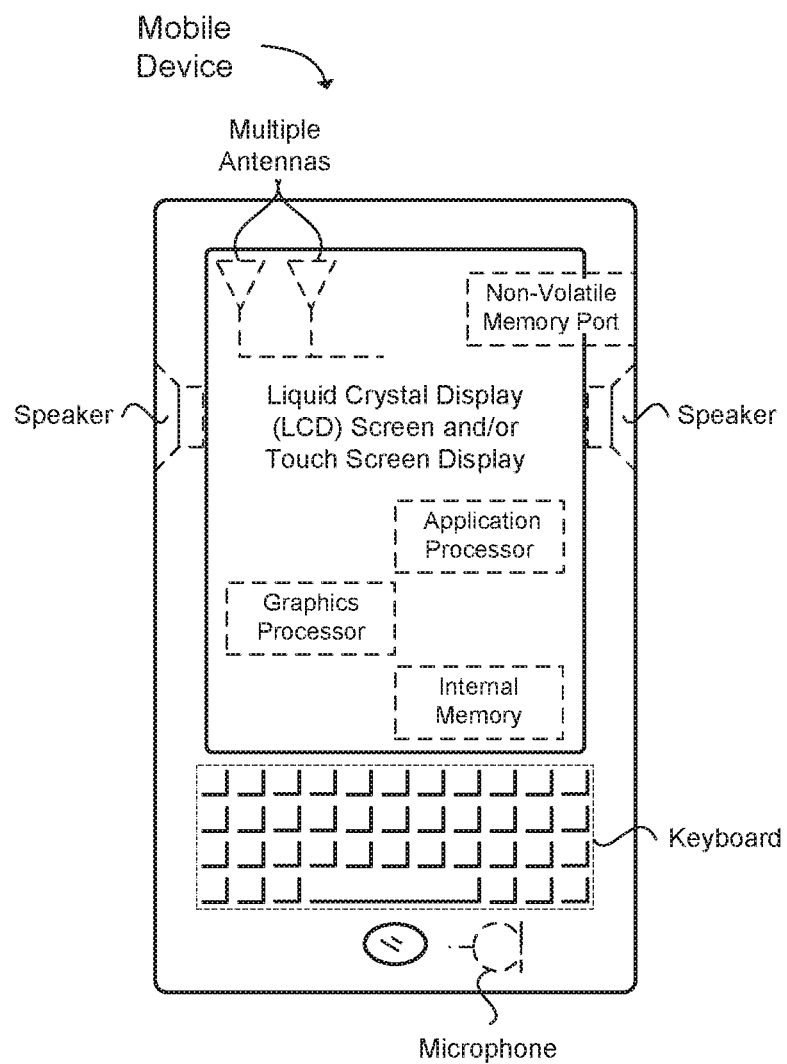
FIG. 8 illustrates a wireless device in accordance with an example.

FIG. 8 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising: a first-direction signal path; a second-direction signal path; and a controller operable to: set a first automatic gain control (AGC) level for the first-direction signal path based on a second-direction received signal level; set a second AGC level for the second-direction signal path based on the second-direction received signal level where the second AGC level has a differential with respect to the first AGC level; identify a signal type for communication on one of the first-direction signal path or the second-direction signal path; and adjust the differential between the first AGC level and second AGC level based on the identified signal type.

Example 2 includes the repeater of Example 1, wherein the controller is operable to adjust the differential by reducing the differential between the first AGC level and the second AGC level when the identified signal type is a first signal type.

Example 3 includes the repeater of any of Examples 1 to 2, wherein the first signal type is a Voice over Long Term Evolution (VoLTE) signal type.

Example 4 includes the repeater of any of Examples 1 to 3, wherein the controller is operable to adjust the differential by increasing the differential between the first AGC level and the second AGC level when the identified signal type is a second signal type.

Example 5 includes the repeater of any of Examples 1 to 4, wherein the second signal type is a non-Voice over Long Term Evolution (non-VoLTE) signal type.

Example 6 includes the repeater of any of Examples 1 to 5, wherein the controller is operable to adjust the differential by increasing the differential between the first AGC level and the second AGC level when the identified signal type is not the first signal type.

Example 7 includes the repeater of any of Examples 1 to 6, wherein the controller is operable to identify the signal type based on an indicator received at the repeater from a mobile device.

Example 8 includes the repeater of any of Examples 1 to 7, wherein the indicator is received at the repeater from the mobile device over one of: a Bluetooth connection, a WiFi connection or a cellular connection between the repeater and the mobile device.

Example 9 includes the repeater of any of Examples 1 to 8, wherein the first-direction signal path is an uplink signal path and the second-direction signal path is a downlink signal path.

Example 10 includes the repeater of any of Examples 1 to 9, wherein the differential between the first AGC level and the second AGC level is an adjustable differential that is between −17 decibels (dB) and +17 dB.

Example 11 includes the repeater of any of Examples 1 to 10, wherein the second-direction received signal level is a downlink received signal strength indicator (RSSI) level.

Example 12 includes a repeater, comprising: a first-direction signal path; a second-direction signal path; and a controller operable to: set a first gain for the first-direction signal path based on a second-direction received signal level; set a second gain for the second-direction signal path based on the second-direction received signal level with a differential with respect to the first gain, wherein the differential between the first gain and the second gain is set for a first signal type; and adjust the differential between the first gain and the second gain for a second signal type.

Example 13 includes the repeater of Example 12, wherein the first-direction signal path is an uplink signal path and the second-direction signal path is a downlink signal path.

Example 14 includes the repeater of any of Examples 12 to 13, wherein the first signal type is a Voice over Long Term Evolution (VoLTE) signal type and the second signal type is a non-VoLTE signal type.

Example 15 includes the repeater of any of Examples 12 to 14, wherein the differential between the first gain and the second gain is an adjustable gain differential that is between −17 decibels (dB) and +17 dB.

Example 16 includes the repeater of any of Examples 12 to 15, wherein the differential between the first gain and the second gain is a negative gain differential value to mitigate amplitude ripple on a defined channel of the repeater.

Example 17 includes the repeater of any of Examples 12 to 16, wherein the controller is operable to: receive from a mobile device in communication with the repeater, an indication that the mobile device is performing a Voice over Long Term Evolution (VoLTE) call; and adjust the differential between the first gain and the second gain in response to receiving the indication from the mobile device.

Example 18 includes the repeater of any of Examples 12 to 17, wherein the controller is operable to receive the indication from the mobile device via a Bluetooth connection between the repeater and the mobile device.

Example 19 includes a repeater, comprising: a first-direction signal path; a second-direction signal path; and a controller operable to: receive an adjustable gain differential setting from a user of the repeater; and set an adjustable gain differential between the first-direction signal path and the second-direction signal path in accordance with the adjustable gain differential setting received from the user of the repeater.

Example 20 includes the repeater of Example 19, wherein the adjustable gain differential between the first-direction signal path and the second-direction signal path is enforced when a power level of one of a first-direction signal or a second-direction signal is above a defined threshold.

Example 21 includes the repeater of any of Examples 19 to 20, wherein the adjustable gain differential between the first-direction signal path and the second-direction signal path ranges from −17 decibels (dB) to +17 dB.

Example 22 includes the repeater of any of Examples 19 to 21, wherein the adjustable gain differential between the first-direction signal path and the second-direction signal path is a negative gain differential value to mitigate amplitude ripple on a defined channel of the repeater.

Example 23 includes the repeater of any of Examples 19 to 22, wherein the controller is operable to set the adjustable gain differential between the first-direction signal path and the second-direction signal in accordance with the gain differential setting prior to processing Voice over Long Term Evolution (VoLTE) signals for a mobile device.

Example 24 includes a repeater, comprising: a first-direction signal path; a second-direction signal path; and a controller operable to: identify a first-direction signal that is received on the first-direction signal path; determine that a power level of the first-direction signal exceeds a defined threshold; and adjust a first gain of the first-direction signal path and a second gain of the second-direction signal path in accordance with an adjustable gain differential between the first-direction signal path and the second-direction signal path when the power level of the first-direction signal exceeds the defined threshold.

Example 25 includes the repeater of Example 24, wherein the first-direction signal path is an uplink signal path and the second-direction signal path is a downlink signal path, wherein the first-direction signal is an uplink signal.

Example 26 includes the repeater of any of Examples 24 to 25, wherein the first-direction signal path is a downlink signal path and the second-direction signal path is an uplink signal path, wherein the first-direction signal is a downlink signal.

Example 27 includes the repeater of any of Examples 24 to 26, wherein the adjustable gain differential between the first-direction signal path and the second-direction signal path is a varying gain differential that is between −17 decibels (dB) and +17 dB.

Example 28 includes the repeater of any of Examples 24 to 27, wherein the controller is operable to adjust the first gain of the first-direction signal path and the second gain of the second-direction signal path in accordance with the adjustable gain differential when the repeater is processing Voice over Long Term Evolution (VoLTE) signals for a mobile device.

Example 29 includes the repeater of any of Examples 24 to 28, wherein the controller is operable to: receive from a mobile device in communication with the repeater, an indication that the mobile device is performing a Voice over Long Term Evolution (VoLTE) call; and adjust the first gain of the first-direction signal path and the second gain of the second-direction signal path in accordance with the adjustable gain differential in response to receiving the indication from the mobile device.

Example 30 includes the repeater of any of Examples 24 to 29, wherein the controller is operable to determine that the power level of the first-direction signal exceeds a defined threshold based on a received signal strength indicator (RSSI) of the first-direction signal.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:
1. A repeater, comprising:
a first-direction signal path;
a second-direction signal path; and
a controller operable to:
set a first automatic gain control (AGC) level for the first-direction signal path based on a second-direction received signal level;
set a second AGC level for the second-direction signal path based on the second-direction received signal level where the second AGC level has a differential with respect to the first AGC level;
identify a signal type for communication on one of the first-direction signal path or the second-direction signal path; and
adjust the differential between the first AGC level and second AGC level based on the identified signal type.

2. The repeater of claim 1, wherein the controller is operable to adjust the differential by reducing the differential between the first AGC level and the second AGC level when the identified signal type is a first signal type.

3. The repeater of claim 2, wherein the first signal type is a Voice over Long Term Evolution (VoLTE) signal type.

4. The repeater of claim 2, wherein the controller is operable to adjust the differential by increasing the differential between the first AGC level and the second AGC level when the identified signal type is not the first signal type.

5. The repeater of claim 1, wherein the controller is operable to adjust the differential by increasing the differential between the first AGC level and the second AGC level when the identified signal type is a second signal type.

6. The repeater of claim 5, wherein the second signal type is a non-Voice over Long Term Evolution (non-VoLTE) signal type.

7. The repeater of claim 1, wherein the controller is operable to identify the signal type based on an indicator received at the repeater from a mobile device.

8. The repeater of claim 7, wherein the indicator is received at the repeater from the mobile device over one of: a Bluetooth connection, a WiFi connection or a cellular connection between the repeater and the mobile device.

9. The repeater of claim 1, wherein the first-direction signal path is an uplink signal path and the second-direction signal path is a downlink signal path.

10. The repeater of claim 1, wherein the differential between the first AGC level and the second AGC level is an adjustable differential that is between −17 decibels (dB) and +17 dB.

11. The repeater of claim 1, wherein the second-direction received signal level is a downlink received signal strength indicator (RSSI) level.

12. A repeater, comprising:
a first-direction signal path;
a second-direction signal path; and
a controller operable to:
set a first gain for the first-direction signal path based on a second-direction received signal level;
set a second gain for the second-direction signal path based on the second-direction received signal level with a differential with respect to the first gain, wherein the differential between the first gain and the second gain is set for a first signal type; and
adjust the differential between the first gain and the second gain for a second signal type.

13. The repeater of claim 12, wherein the first-direction signal path is an uplink signal path and the second-direction signal path is a downlink signal path.

14. The repeater of claim 12, wherein the first signal type is a Voice over Long Term Evolution (VoLTE) signal type and the second signal type is a non-VoLTE signal type.

15. The repeater of claim 12, wherein the differential between the first gain and the second gain is an adjustable gain differential that is between −17 decibels (dB) and +17 dB.

16. The repeater of claim 12, wherein the differential between the first gain and the second gain is a negative gain differential value to mitigate amplitude ripple on a defined channel of the repeater.

17. The repeater of claim 12, wherein the controller is operable to:
receive from a mobile device in communication with the repeater, an indication that the mobile device is performing a Voice over Long Term Evolution (VoLTE) call; and
adjust the differential between the first gain and the second gain in response to receiving the indication from the mobile device.

18. The repeater of claim 17, wherein the controller is operable to receive the indication from the mobile device via a Bluetooth connection between the repeater and the mobile device.

19. A repeater, comprising:
a first-direction signal path;
a second-direction signal path; and
a controller operable to:
receive an adjustable gain differential setting from a user of the repeater; and
set an adjustable gain differential between the first-direction signal path and the second-direction signal path in accordance with the adjustable gain differential setting received from the user of the repeater.

20. The repeater of claim 19, wherein the adjustable gain differential between the first-direction signal path and the second-direction signal path is enforced when a power level of one of a first-direction signal or a second-direction signal is above a defined threshold.

* * * * *